United States Patent

Kelly, deceased et al.

[15] 3,637,022

[45] Jan. 25, 1972

[54] USE OF HIGH WATER CONTENT OIL-EXTERNAL MICELLAR SOLUTIONS FOR EXTINGUISHING FIRES

[72] Inventors: Joe T. Kelly, deceased, late of Littleton, Colo. by La Verne S. Kelly, executrix; Jack L. Hummel, Littleton, Colo.

[73] Assignee: Marathon Oil Company, Findlay, Ohio

[22] Filed: Oct. 30, 1969

[21] Appl. No.: 873,732

[52] U.S. Cl. ..................................169/1, 252/2, 252/8.05, 252/309
[51] Int. Cl. .........................................................A62d 1/00
[58] Field of Search................252/2, 8.05, 8.55 D, 308, 309, 252/353, 355, 357; 169/1

[56] References Cited

UNITED STATES PATENTS

| | | | |
|---|---|---|---|
| 2,182,440 | 12/1939 | Kotz et al. | 252/2 |
| 2,356,205 | 8/1944 | Blair, Jr. et al. | 252/8.55 |
| 3,254,714 | 7/1966 | Gogarty et al. | 252/8.55 |
| 3,297,084 | 1/1967 | Gogarty et al. | 166/274 |
| 3,330,343 | 7/1967 | Tosch et al. | 252/8.55 |
| 3,356,610 | 12/1967 | Maestre et al. | 252/2 |
| 3,425,939 | 2/1969 | Juilliard et al. | 252/2 |
| 3,432,454 | 3/1969 | Hibbard | 252/2 |

*Primary Examiner*—John T. Goolkasian
*Assistant Examiner*—D. J. Fritsch
*Attorney*—Joseph C. Herring, Richard C. Willson, Jr. and Jack L. Hummel

[57] ABSTRACT

A fire-retardant composition comprising an oil-external micellar dispersion containing from about 50 to about 90 percent water, from at least about 3 to about 15 percent surfactant, and from at least about 4 to about 40 percent hydrocarbon is used to extinguish fires, especially hydrocarbon fires, occurring in or near water (e.g. on ships), offshore drilling rigs, etc., and fires occurring in oil and refining facilities where it is imperative to quickly remove the burning oil from the equipment. Additionally, the oil-external micellar dispersion may comprise a cosurfactant, various fire-extinguishing salts, halogenated hydrocarbons, gelling agents, corrosion inhibiting agents, and coloring agents.

12 Claims, No Drawings

3,637,022

USE OF HIGH WATER CONTENT OIL-EXTERNAL MICELLAR SOLUTIONS FOR EXTINGUISHING FIRES

DESCRIPTION OF THE PRIOR ART

The use of halogenated hydrocarbons in fire-extinguishing compositions is known. For example, French Pat. No. 1,373,038, to Maestre teaches the use of halogenated butadiene, halogenated butene, and other halogenated hydrocarbons mixed with halogenated methane, and/or halogenated ethane, in order to prevent and extinguish fires "due to flammable materials floating on water."

Belgian Pat. No. 659,312, to Schrieber discloses a universal fire-extinguishing composition wherein a preparation comprising sodium sulfate or sodium phosphate can be used to extinguish fires of an electrical nature as well as fires occurring in wood or oil.

*Fire Protection Manual for Hydrocarbon Processing Plants,* edited by Charles H. Vervalin, published by Gulf Publishing Co., teaches that the combination of halogen and phosphorus in the same molecule gives an assortment of good flame-retardant additives. Among these compounds mentioned at page 95 are tris(2,3-dibromo propyl) phosphate in polystyrene, and in cellulose acetate, polyhalophenyl phosphates in addition to polymers and in cellulose acetate, and halogenated alkyl phosphonate in vinyl alkyd resins. The organobromo and/or chlorophosphorus compounds are also said to have excellent flame-retardant qualities.

Recently, compound surfactants have been used in fire-extinguishing preparations. Charles H. Vervalin (in *Fire Protection Manual for Hydrocarbon Processing Plants,* supra) discusses the use of cationic and ampholytic surfactants, mixed to maintain the correct hydrophilic-lyophilic balance, which under normal agitation will form a heat-stable emulsion emulsifying the burning fuel with water.

Therefore, the inclusion of fire-extinguishing salts, phosphates, halogenated hydrocarbons, and surfactants in fire-extinguishing compositions is known in the prior art. However, the use of oil-external micellar dispersions, especially dispersions which are capable of comprising a high water content, having a minimum surface tension with hydrocarbon, are novel to firefighting technology.

DESCRIPTION OF THE INVENTION

The term "micellar dispersion" as used herein is meant to include micellar solutions, microemulsions, "transparent" emulsions (Blair, Jr. et al., U.S. Pat. No. 2,356,205) and micellar solution technology taught in C. G. Summer, Clayton's, *The Theory of Emulsions and Their Technical Treatment,* 5th Ed., pp. 315–320 (1954). Examples of useful micellar solutions include those defined in U.S. Pat. No. 3,254,714, to Gogarty.

The micellar dispersions used in this invention are composed of hydrocarbon, aqueous medium and surfactant. Co-surfactant(s) and electrolyte(s) may optionally be incorporated into the dispersion. Examples of volume amounts include from about 4 to about 40 percent hydrocarbon, from about 50 to about 90 percent aqueous media (preferably 70–90 percent), at least about 3 percent surfactant, but preferably not more than 15 percent, from about 0.01 to about 20 percent cosurfactant (also identified as cosolubilizer and semipolar organic compound) and from about 0.001 to about 5 percent or more (weight percent based on aqueous medium) of electrolyte. Also, the dispersion can contain other known firefighting additives to impart desired characteristics.

Preferably, the hydrocarbon of the micellar solution, or at least a sufficient portion of it, is halogenated to give increased fire-retarding capabilities. Halogenated hydrocarbons have independent flame-retardation capabilities as taught by Vervalin, *Fire Protection Manual for Hydrocarbon Processing Plants* at p. 94. However, unhalogenated hydrocarbons are also useful. Examples of useful hydrocarbons include crude oil (both sweet and sour), partially refined fractions of crude oil, refined fractions of crude oil and synthesized hydrocarbons. Specific examples of hydrocarbon include side cuts from crude columns, crude column overheads, gas oils, kerosene, heavy naphthas, naphthas, straight-run gasoline, pentane, heptane, decane, dodecane, cyclohexane, aryl compounds including mono- and poly-cyclic compounds and substituted compounds thereof, etc. The hydrocarbon can also be unsulfonated hydrocarbon within the sulfonatable hydrocarbon. Also, the hydrocarbon can be a mixture of any of the above or equivalent to the above.

The aqueous medium can be distilled water, soft water, brackish water, brine water, sea water, etc.

Surfactants useful in the micellar dispersions include nonionic, cationic, and anionic surfactants. Specific examples include those taught in U.S. Pat. No. 3,254,714, to Gogarty et al. Other useful surfactants include Duponol WAQE (a 30 percent active sodium lauryl sulfate marketed by DuPont Chemical Corp., Wilmington, Del.), Energetic W-100 (a polyoxyethylene alkylphenol marketed by Armour Chemical Co., Chicago, Ill.), Triton–XF 100 (an alkylphenoxy polyethoxyethanol marketed by Rohm & Haas, Philadelphia, Pa.) and Arquad 12–50 (a 50 percent active dodecyl trimethyl ammonium chloride marketed by Armour Chemical Co., Chicago, Ill.), and like materials.

Preferably, the surfactant is a petroleum sulfonate, also known as alkyl aryl naphthenic sulfonate. The sulfonate can contain a monovalent, divalent or higher valency cation. Examples of preferred surfactants are the sodium and ammonium petroleum sulfonates having an average equivalent weight within the range of from about 350 to about 520, and more preferably from about 360 to about 470. The surfactant can be a mixture of low and high average equivalent weight sulfonates or a mixture of two or more different surfactants.

Cosurfactants useful with the invention include alcohols, amino compounds, esters, aldehydes, ketones, and like materials containing from about one to about 20 carbon atoms. More preferably, the cosurfactant contains from about three to about 16 carbon atoms. Specific examples include alcohols such as isopropanol, n- and iso-butanol, amyl alcohols such as n-amyl alcohol, 1- and 2-hexanol, 1- and 2-octanol, decyl alcohols, dodecyl alcohols, etc., alkaryl alcohols such as P-nonylphenol and alcoholic liquors such as fusel oil. As mentioned previously, concentrations of 0.1–20 percent by volume of cosurfactant are useful in the micellar dispersions and more preferably from about 0.1 to about 5 percent. Mixtures of two or more cosurfactants are also useful.

Electrolytes useful in the micellar dispersions include inorganic acids, inorganic bases, inorganic salts, organic acids, organic bases, and organic salts. Specific examples of electrolytes include sodium hydroxide, sodium chloride, sodium sulfate, hydrochloric acid, sulfuric acid, and those electrolytes found in U.S. Pat. No. 3,330,343, to Tosch et al. and U.S. Pat. No. 3,297,084, to Gogarty et al.

The amount of hydrocarbon in the total fire-extinguishing composition may range from at least about 4 percent to about 40 percent, but a range of from about 4 percent to about 20 percent is preferable, and a range of from about 4 percent to about 15 percent is most preferable.

Various additives can be incorporated into the micellar solution. Fire-extinguishing salts such as sodium bromide, the metal salts of phosphoric acid, such as sodium orthophosphate, or diammonium phosphate, and halogenated hydrocarbons such as chlorobromomethane, bromotrifluoromethane, can be employed. Gelling agents may be incorporated in the micellar solutions in those fire situations where undamaged equipment is to be given a protective coating of the fire-inhibiting agent. Carboxymethyl cellulose, ammonium polypectate, and algin are often used in this respect.

Other additives useful in the micellar dispersion include corrosion inhibitors such as sodium fluosilicates, coloring dyes or pigments to mark the area covered by the fire-fighting solution, foaming agents, etc.

TABLE I

| Sample | Surfactant | | Hydrocarbon | | Aqueous medium | | Cosurfactant | |
|---|---|---|---|---|---|---|---|---|
| | Percent | Type | Percent | Type | Percent | Type | Ml./100 ml. | Type |
| A | 5.2 | Ammonium petroleum sulfonate (average MW=440, 81% active). | 24.75 | Crude oil | 70 | 60% water containing about 18,000 p.p.m. of dissolved solids 40% water containing about 420 p.p.m. of dissolved solids. | 0.08<br>0.25 | n-Amyl alcohol.<br>Isopropanol. |
| B | 10 | "Pyronate 50" | 20 | do | 70 | do | 3.25 | Hexanol. |
| C | 10 | "Petronate L" | 20 | Straight-run gasoline. | 70 | do | 4.24 | n-Amyl alcohol. |
| D | 20 | "Duponol WAQE" | 10 | do | 70 | Distilled water | 14 | i-Amyl alcohol. |
| E | 10 | "Energetic W-100" | 20 | do | 70 | do | 8.5 | Do. |
| F | 10 | "Triton X-100" | 20 | do | 70 | do | 5.5 | Do. |
| G | 20 | "Arquad 12-50" | 10 | do | 70 | do | 17.0 | Do. |
| H | 16.6 | Sodium petroleum sulfonate (average MW=465, 62% active). | 16.6 | do | 66.6 | do | 1.3 | Isopropanol. |
| I | 10 | Ammonium petroleum sulfonate (average MW=440, 81% active). | 5 | Crude oil | 85 | 60% water containing about 18,000 p.p.m. of dissolved solids 40% water containing about 420 p.p.m. of dissolved solids. | 2.5 | n-Amyl alcohol. |

LEGEND.—(1) Pyronate 50, a sodium petroleum sulfonate, average molecular weight 350. Sold by Sonneborn Chemical Co., 300 Park Ave. S., New York, N.Y. 10010. (2) Petronate L, a sodium petroleum sulfonate, average molecular weight 422. Sold by Sonneborn Chemical Co., 300 Park Ave. S., New York, N.Y. 10010. The amount of cosurfactant is based on ml. of cosurfactant per 100 ml. of liquid containing surfactant, hydrocarbon and aqueous medium.

The compositions taught herein may be applied in any convenient and efficient manner known to the art. Conventional fire-extinguishing equipment, such as the proportional nozzle used to spray burning matter with fire-extinguishing foam may be used. Effective micellar solutions may be quickly prepared at the time the fire begins from a stock of the necessary ingredients kept at the site of the fire. Small or large quantities of prepared ingredients may be safely stored and mixed with the proper volumes of water as the composition is applied to the flames, e.g., mixed at a nozzle or at a manifold before being sprayed on the fire. The proportional nozzle easily facilitates the latter approach.

It is also postulated that in practice, the oil-external micellar solutions of the invention will form a surface emulsion with the combustible hydrocarbons, thereby separating the fuel from the flame. The water of the micellar solution will be vaporized by the flame, and the ensuing clouds of steam will form a blanket which will tend to smother the fire by absorbing the heat of combustion, and by preventing oxygen from reaching the burning fuel.

Furthermore, the micellar dispersion can be designed to possess lower electrical conductivity characteristics (see U.S. Pat. No. 3,254,714, to Gogarty et al.) which may be advantageous in fighting fires near electrical equipment. Micellar dispersions with minimum concentrations of electrolyte and made up with "pure" sulfonate (i.e., containing minimum salt) are useful in this environment.

The chemical and physical distinctions between emulsions and micellar dispersions are well known in solution technology. For the purposes of this invention, it is postulated that interfacial surface tensions between the burning or combustible hydrocarbon and the micellar dispersion will be at a minimum. Thus, the reduced surface tension will tend to cause the hydrocarbon to "solubilize" or easily mix with the micellar dispersion and hence the hydrocarbon will be more easily removed from the fire scene.

This invention is capable of variations and modifications which may become apparent to those skilled in the art following a reading of this specification. Such is intended to be included within the scope of the invention as defined in the specification and appended claims.

The following example is presented to teach working embodiments of the invention. Unless otherwise specified, all percents are based on volume.

EXAMPLE I

This example is presented to show oil-external micellar dispersions containing different components and amounts within the dispersion. Examples indicated in Table I are prepared at room temperature with minimal agitation. The compositions of the micellar dispersions are indicated in Table I.

What is claimed is:

1. A method of extinguishing a hydrocarbon fire, the method comprising contacting the hydrocarbon fire with an oil-external micellar dispersion comprised of about 50 to about 90 percent water, about 3 to about 15 percent surfactant, and about 4 to about 40 percent hydrocarbon.

2. The method of claim 1 wherein the surfactant is a petroleum sulfonate having an average equivalent weight within the range of from about 350 to 520.

3. The method of claim 1 wherein the hydrocarbon is comprised of at least a portion of a halogenated hydrocarbon.

4. The method of claim 2 wherein the dispersion contains at least one or more of the group selected from flame-retarding water soluble phosphates, gelling agents, halogenated hydrocarbons, corrosion inhibiting agents, foaming agents and a visible amount of colored marking agent.

5. The method of claim 1 wherein the dispersion contains one or more of the components selected from the group consisting of cosurfactant and electrolyte.

6. A method of extinguishing a hydrocarbon fire comprising contacting the burning hydrocarbon with an oil-external micellar dispersion comprised of about 70 to 90 water, at least about 3 to about 15 percent of a petroleum sulfonate, and about 4 to about 20 percent hydrocarbon.

7. The method of claim 6 wherein the dispersion contains one or more of the components selected from the group consisting of cosurfactant and electrolyte.

8. The method of claim 6 wherein the hydrocarbon is comprised of at least a portion of halogenated hydrocarbon.

9. The method of claim 7 wherein the petroleum sulfonate has an average equivalent weight within the range of from about 350 to about 520.

10. The method of claim 7 wherein the hydrocarbon is a halogenated hydrocarbon.

11. The method of claim 7 wherein the micellar dispersion components are mixed together at a proportional nozzle to form the micellar dispersion.

12. The method of claim 7 wherein the micellar dispersion contains at least one or more of the components selected from the group consisting of flame-retarding water-soluble phosphates, gelling agents, halogenated hydrocarbons, corrosion inhibiting agents, foaming agents, and a visible amount of colored marking agent.

* * * * *